March 15, 1955    I. NESSON    2,703,900
CONNECTOR FOR WINDSHIELD WIPER BLADES
Filed May 31, 1951    2 Sheets-Sheet 2
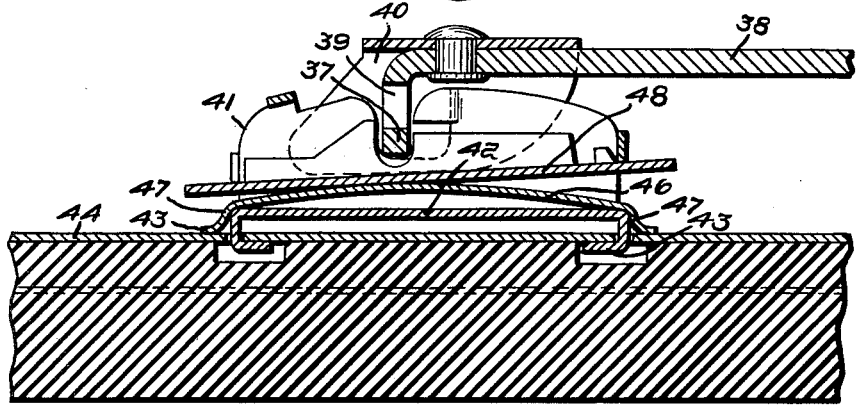
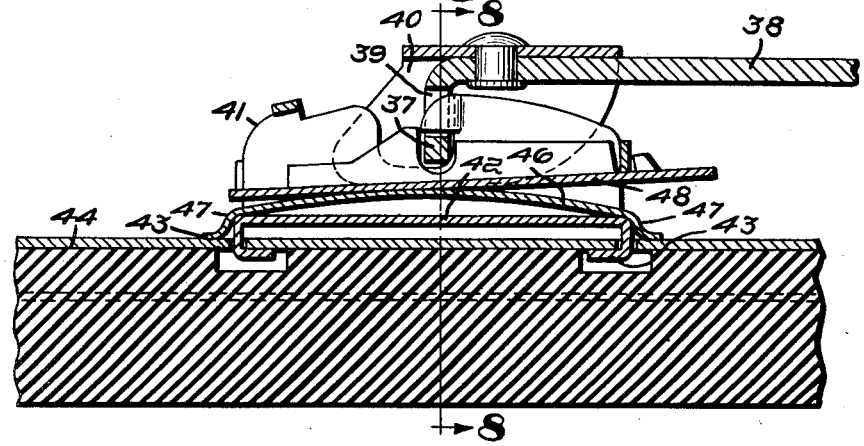
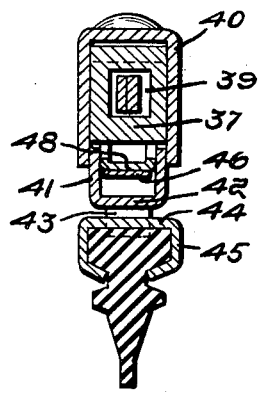
Inventor:
Israel Nesson,
by Thomson & Thomson
Attorneys

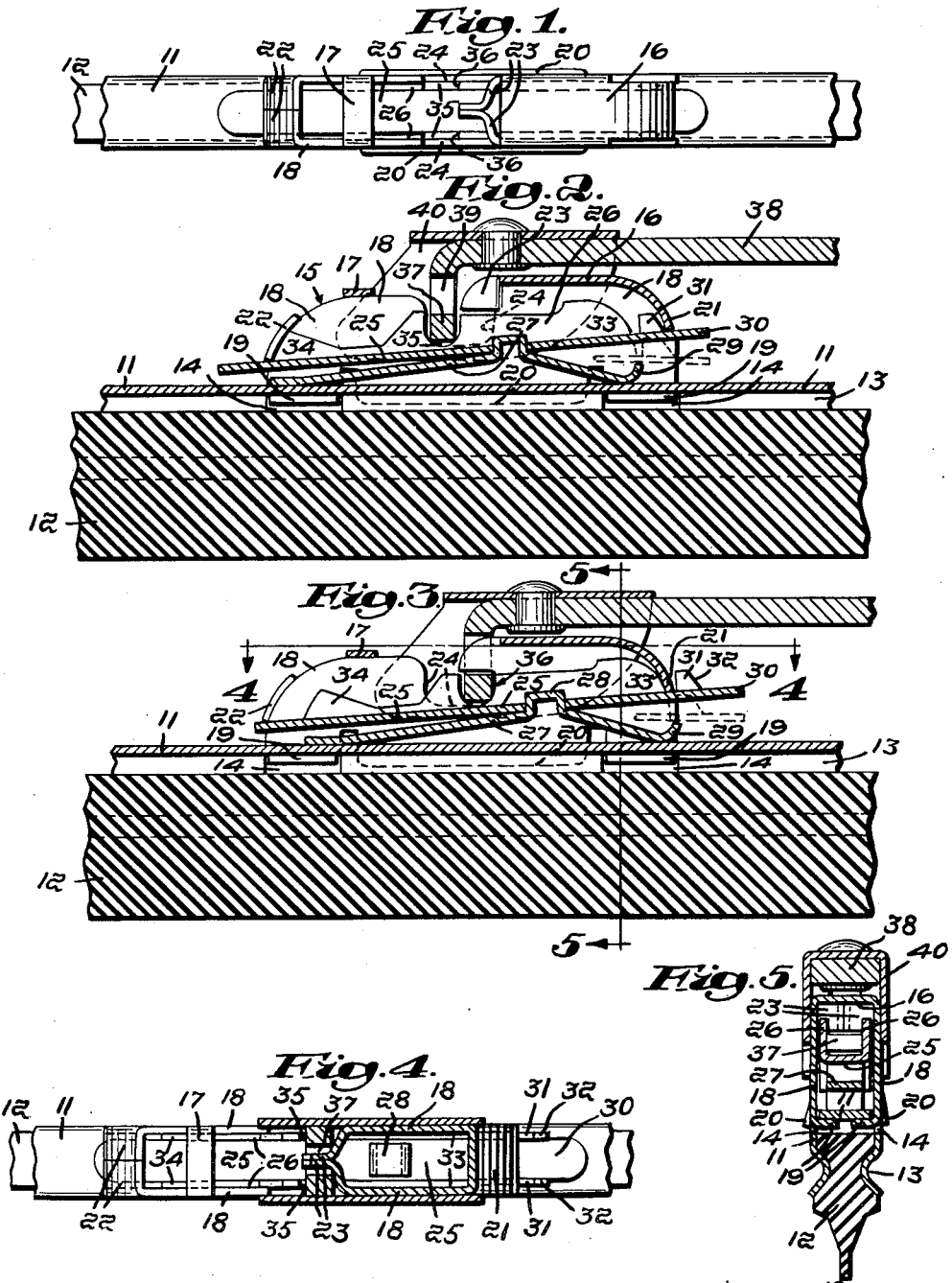

United States Patent Office

2,703,900
Patented Mar. 15, 1955

2,703,900

CONNECTOR FOR WINDSHIELD WIPER BLADES

Israel Nesson, Lynn, Mass., assignor to Max Zaiger, Swampscott, Mass.

Application May 31, 1951, Serial No. 229,153

10 Claims. (Cl. 15—250)

This invention relates to connectors for attaching a windshield wiper arm to a wiper blade, and pertains more particularly to improvements in a clip or connector mounted on the wiper blade and having releasable locking engagement with the pivotally connected end of a wiper arm.

The principal purpose of the invention is to provide a connector of simple and durable construction and easy and efficient operation, which will readily receive a cross bar or pin carried by the end of the arm and effectively lock the cross bar against accidental displacement, while ensuring adequate pivotal movement between the arm and blade and permitting quick and easy separation of the locking connection.

Another object is to provide a connector of this type in which a spring-pressed gate member is slidable longitudinally within a housing of the connector, the gate member being notched or recessed to receive the cross bar of the arm and having a locking stud releasably engageable with the housing, whereby the gate is moved to locking position and carries the cross bar under a catch formed on the housing when the cross bar is inserted in the gate notch and the arm is retracted to close the gate, and whereby the gate may be unlocked to free the cross bar only by manually releasing the lock.

A further object is to provide a connector of the character described which is rockably mounted on the blade, and in which a spring member within the housing tends to restrain transverse rocking of the connector and also yieldingly holds the gate in locking position, the spring preferably engaging the gate so that it slides longitudinally of the housing when the gate is moved.

These and other features of the improved connector are shown in the accompanying drawings illustrating recommended embodiments of the invention, but it will be understood that the structural details of the devices herein shown and described may be varied to suit particular purposes or conditions without departing from the essence of this invention as defined in the appended claims. It will also be understood that the improved connector may be employed in windshield wipers for automotive, aircraft or other uses, and that the construction of the wiper blade, the wiper arm or the means for reciprocating the arm over the windshield is not material to the present invention.

In the drawings,

Fig. 1 is a fragmentary plan view of a wiper blade equipped with a preferred form of the improved connector;

Fig. 2 is a central longitudinal section of the blade and connector of Fig. 1, with the connector gate in unlocked position and showing the complemental end of a wiper arm received in the notches of the sliding gate in position either to be removed therefrom or to be moved to slide and lock the gate;

Fig. 3 is a view similar to Fig. 2, showing the gate in locking position and the cross bar of the arm secured beneath the catches of the connector housing;

Fig. 4 is a longitudinal section on line 4—4 of Fig. 3;

Fig. 5 is a transverse section on line 5—5 of Fig. 3;

Fig. 6 is a view similar to Fig. 2 showing a modified form of connector;

Fig. 7 is a view similar to Fig. 6, showing the parts in locking position; and

Fig. 8 is a transverse section on line 8—8 of Fig. 7.

In the particular embodiment chosen for the purpose of illustration in Figs. 1 to 5, the connector is rockably mounted for restrained transverse tilting movement with respect to the wiper blade which comprises a channeled metal shell or holder 11, and a rubber wiper strip 12 gripped between the crimped sides 13 of the shell. Said sides have longitudinally spaced pairs of opposed slots or openings 14.

The housing 15 of the connector is generally channel or box shaped and comprises a top wall 16 near one end, a top brace 17 near the other end, and similarly formed, depending sides 18 provided with inturned pairs of ears 19 adjacent the ends of the connector, said ears being loosely received in the respective slots 14 of the blade shell, so that the connector is hinged to the blade and may rock or tilt transversely when thus mounted. Intermediate the pairs of mounting ears, the housing sides flare outwardly as indicated at 20 to allow such rocking motion. The rocking of the connector with respect to the blade is resiliently restrained as hereafter explained.

A downwardly sloping portion 21 of the top wall 16 partially closes one end of the housing but terminates remote from the top of the shell 11, and the bottom portion of this inclined end wall 21 constitutes an abutment engageable by the elements of the sliding gate described below. At the opposite end of the housing, tabs 22 bent inwardly from the housing sides 18 provide an end abutment spaced from the top of the shell 11, said abutment also being engageable by elements of said gate. Adjacent the inner end of the top wall 16, tongues 23 of the sides 18 are bent inwardly of the housing, the end portions of said tongues preferably having juxtaposed surfaces and constituting a fixed catch member of the arm bar lock. Said catch member 23, 23 overhangs the housing channel in the central region of the housing, and the sides 18 are recessed at 24 in said region.

A gate member having a base 25 and upstanding sides 26, is slidable longitudinally within the housing 15. The respective ends of the base 25 project beneath the abutments 21 and 22 and beyond the ends of the housing, and are resiliently pressed against said abutments by an underlying bowed spring 27, the end portions of which bear against the top of the shell 11. Said spring also serves to bias the connector away from the blade holder, and thus yieldingly restrains transverse rocking movement of the hinged connector housing. Other resilient means may obviously be employed for this purpose. When a leaf spring is used, as illustrated, it is preferably connected with the gate base 25 so that it slides longitudinally with the gate, as by the engagement of a detent 28 of the spring within a complemental opening in the base 25.

One end of the spring 27 may be bent upwardly at 29 to provide a stop limiting downward movement of the deflectable end portion 30 of the gate base, as indicated by the broken line position of Figs. 2 and 3. Said end portion carries one or more upstanding locking lugs 31, two such lugs being shown (Fig. 4) at opposite sides of the base end 30. The outermost faces of the lugs are inclined and provide cam surfaces 32 for a purpose to be explained.

The sides 26 of the sliding gate terminate in end portions 33 and 34, spaced inwardly from the extreme ends of the base 25 and disposed within the housing. Said ends 33 and 34 form stop members respectively engageable with the inner surfaces of the housing abutments 21 and 22, to limit sliding movement of the gate in both directions. Intermediate said end portions and cooperating with the recesses 24 in the housing sides, the gate sides 25 have notches 35 defining shoulders 36. When the gate is in unlocked position (Fig. 2), the gate notches 35 and the housing recesses 24 provide transversely aligned pockets in the sides of said connector members for freely receiving the cross bar 37 at the end of a wiper arm. When the gate is in locked position (Fig. 3), the gate notches 35 underly the overhanging catch member 23 of the housing and said cross bar is pivotally and securely held by the connector, the gate being secured against longitudinal movement by the engagement of its side stops 33 against the inner surface of the housing abutment 21, and the engagement of its locking lugs 31 against the outer surface of said abutment.

The end portion 38 of the wiper arm, or arm extension, as herein shown, has a downwardly offset terminal formed with an opening 39 therethrough and the transverse bridge forming a frame part of said opening constitutes the cross bar 37. The opening 39 receives the catch members 23 when the cross bar is locked in the connector. The arm end may also be equipped with a channel piece 40, the sides of which embrace the housing 18 (Fig. 5), but it will be apparent that the precise form or construction of the end portion of the wiper arm is not material to this invention so long as the arm end has a cross bar or the equivalent which may be pivotally received and locked in the connector in the manner herein disclosed.

To apply and connect the arm end, the gate is moved, if necessary, to the unlocked position of Fig. 2 by manually depressing the projecting end 30 to release the locking lug 31, against the pressure of spring 27, as shown by the broken lines of Fig. 3; the gate is then pushed inwardly of the housing until the stops 34 strike the stops 22; and the cross bar is placed in the open connector pocket. The bar may then be engaged under the latch members 23 by moving the wiper blade relative to the arm (to the left of Fig. 2), thereby sliding the gate to locking position; for the pressure of the cross bar 37 against the shoulders 36 of the gate sides will force the cam surfaces 32 of the lugs 31 under the inclined abutment 21, automatically depressing the spring 27, without the necessity of applying manual downward pressure on the gate end 30, as indicated by the broken line position of the gate in Fig. 2.

The cross bar is thus securely attached to the connector until the locked gate is manually released and moved to unlocking position as aforesaid. It will be observed that the cross bar of the wiper arm is secured by a bolt-like action of the connector elements, and that the sole function of the spring in the locking operation is to prevent release of the gate lugs. Hence, the spring is not placed under heavy strain, and a relatively weak spring will serve the purpose and remain effective indefinitely.

The construction and operation of the locking elements of the modified connector illustrated in Figs. 6 to 8 are substantially as above described, but the housing 41 is mounted in a different manner on the wiper blade, and the structural details of the connector elements are varied. In the modified arrangement, the connector housing has a base 42 provided with depending end flanges or ears 43 which pass through slots in the top 44 of the blade shell 45 and are crimped under said top to attach the housing to the blade with a slight play or looseness between the base 42 and shell top, so that the housing may rock transversely under restraint of the spring 46. In this form, the bowed spring 46 has ends 47 overhanging the flanged ends of the housing base and bearing on the shell top. Hence, the spring is held stationary and does not slide with the gate 48, as in Figs. 2 and 3.

The elements of sliding gate 48 and the complemental elements of the housing 41 operate and cooperate in the same fashion as the corresponding elements of the parts described in connection with the form of clip shown in Figs. 1 to 5. Other modifications in structure may obviously be practiced while maintaining the essential features of the invention herein disclosed and defined in the following claims.

I claim:

1. A connector carried by a wiper blade for separably and pivotally attaching the blade to a wiper arm having a cross bar adjacent its end, said connector comprising a housing attached to the blade and having a stationary catch member overhanging a bar-receiving pocket of the housing, a gate member slidable longitudinally of the housing and having a bar-receiving notch, the gate being selectively movable to unlocking position at which said cross bar may be received in said pocket and notch and to locking position at which said notch and the cross bar received therein are disposed immediately beneath said catch member and in operative relation thereto to secure the cross bar between the catch member and the notched gate, and means releasably holding the gate member in the respective positions, said holding means comprising a spring resiliently pressing against the bottom of the gate member and complemental abutment elements on said gate member and on the housing respectively for releasably locking the spring-pressed gate against movement relative to the housing.

2. A connector carried by a wiper blade for separably and pivotally attaching the blade to a wiper arm having a cross bar adjacent its end, said connector comprising a housing attached to the blade and having spaced substantially parallel sides and having abutments at its opposite ends, a gate member slidable longitudinally between said sides and having end portions projecting outwardly of the housing and in operative relation to said abutments, and resilient means normally urging said end portions into sliding engagement with the respective abutments, one of said end portions having a locking lug selectively engageable with opposite surfaces of the complemental abutment when the sliding gate is in its locking and unlocking positions, respectively, to restrain movement of the gate, said housing having a catch member disposed above and between its sides, and said gate having a notch for receiving said cross bar when the gate is in unlocking position, the cross bar being disposed in said notch and locked beneath said catch member when the gate is slid to locking position.

3. A connector as described in claim 2, said locking lug having a cam surface slidably engaging a surface of the complemental abutment in the unlocking position of the gate, whereby the gate is cammed from unlocking to locking position by relative longitudinal movement of the arm and blade, the gate being releasable from locking position by manually depressing the end portion having said lug.

4. A connector as described in claim 2, said gate having stop members thereon remote from its opposite ends, said stop members being engageable with the respective housing abutments to limit sliding movement of the gate.

5. A connector as described in claim 2, said gate having spaced substantially parallel sides terminating remote from its opposite ends, the respective ends of said sides constituting stop members alternately engageable with the respective housing abutments to limit sliding movement of the gate in both directions, and each of said gate sides having a bar-receiving notch intermediate the ends thereof.

6. A connector as described in claim 2, said catch member consisting of tongues deflected inwardly from the opposite sides of the housing into surface-abutting relation in the central region of the housing, and said sides having recesses at said region cooperating with said gate notch to provide a pocket for receiving said cross bar.

7. A connector as described in claim 2, said resilient means consisting of a bowed spring having its ends engaging the top of the wiper blade and its central portion engaging the bottom of said gate.

8. A connector as described in claim 2, said resilient means consisting of a bowed spring having its ends engaging the top of the wiper blade and its central portion engaging the bottom of said gate, said housing having mounting elements pivotally connecting the connector to said blade whereby the connector may rock transversely of the blade under the restraining influence of said spring.

9. A connector as described in claim 2, said resilient means consisting of a bowed spring having its ends engaging the top of the wiper blade and its central portion engaging the bottom of said gate, the engaged portions of the spring and gate having mutually interfitting elements preventing relative longitudinal movement between said parts, so that the spring slides with the gate when the latter is moved.

10. A connector as described in claim 2, said gate member having a base provided with integral upstanding side pieces providing a locking lug on each side thereof, each of said lugs having an inclined edge constituting a cam surface having sliding engagement with the complemental housing abutment when the gate is slid from unlocking position to locking position, and said gate notch defining a shoulder engageable by the cross bar received therein, whereby said sliding movement may be effected by relative longitudinal movement of the arm and blade.

References Cited in the file of this patent

UNITED STATES PATENTS

| 301,098 | Coulter | July 1, 1884 |
| 1,546,950 | Stuart | July 21, 1925 |
| 2,266,385 | Scinta | Dec. 16, 1941 |
| 2,432,689 | Smulski | Dec. 16, 1947 |
| 2,432,691 | Smulski | Dec. 16, 1947 |
| 2,432,693 | Anderson | Dec. 16, 1947 |